United States Patent
Al-Gharaibeh et al.

(10) Patent No.: US 11,947,655 B1
(45) Date of Patent: Apr. 2, 2024

(54) SECURE AUTHENTICATION USING COMPANION TRUST

(71) Applicant: Architecture Technology Corporation, Minneapolis, MN (US)

(72) Inventors: Jafar Al-Gharaibeh, Eden Prairie, MN (US); Ryan Lee Hagelstrom, Chaska, MN (US); Jordan C. Bonney, Bloomington, MN (US)

(73) Assignee: ARCHITECTURE TECHNOLOGY CORPORATION, Minneapolis, MN (US)

( * ) Notice: Subject to any disclaimer, the term of this patent is extended or adjusted under 35 U.S.C. 154(b) by 363 days.

(21) Appl. No.: 17/165,511

(22) Filed: Feb. 2, 2021

(51) Int. Cl.
*G06F 21/41* (2013.01)

(52) U.S. Cl.
CPC ...... *G06F 21/41* (2013.01); *G06F 2221/2111* (2013.01); *G06F 2221/2113* (2013.01)

(58) Field of Classification Search
CPC ............. G06F 21/41; G06F 2221/2111; G06F 2221/2113; H04W 12/63
See application file for complete search history.

(56) References Cited

U.S. PATENT DOCUMENTS

| | | | |
|---|---|---|---|
| 7,620,978 B1 * | 11/2009 | Reddy | H04W 12/069 713/168 |
| 7,669,235 B2 | 2/2010 | Hunt et al. | |
| 8,561,142 B1 | 10/2013 | Sobel | |
| 8,970,348 B1 | 3/2015 | Evans et al. | |
| 9,419,799 B1 | 8/2016 | Chung | |
| 9,524,399 B1 | 12/2016 | Takahashi | |
| 9,858,441 B2 | 1/2018 | Brown et al. | |
| 10,091,230 B1 | 10/2018 | Machani et al. | |
| 10,164,974 B2 | 12/2018 | Spencer et al. | |
| 10,762,183 B1 | 9/2020 | Charan et al. | |
| 10,846,391 B1 | 11/2020 | Bonney et al. | |
| 11,455,411 B2 * | 9/2022 | Alameh | G06F 21/6218 |
| 2002/0069369 A1 | 6/2002 | Tremain | |
| 2004/0003284 A1 | 1/2004 | Campbell et al. | |
| 2004/0044902 A1 | 3/2004 | Luthi | |

(Continued)

OTHER PUBLICATIONS

"A Heart to my Key," economist.com., https://www.economist.com/blogs/babbage/2013/05/biometrics, May 9, 2013, 4 pp.

(Continued)

*Primary Examiner* — Daniel B Potratz
(74) *Attorney, Agent, or Firm* — Shumaker & Sieffert, P.A.

(57) ABSTRACT

A computing device may authenticate a user of the computing device as an authorized user. The computing device may, in response to authenticating the user of the computing device as the authorized user, transition from a locked state to an unlocked state. The computing device may, in response to authenticating the user of the computing device as the authorized user, determine one or more computing devices that are proximate to the computing device. The computing device may, in response to determining the one or more computing devices that are proximate to the computing device, send to each of the one or more computing devices an indication of successful user authentication by the computing device to enable each of the one or more computing devices to transition from the locked state to the unlocked state without performing user authentication.

16 Claims, 4 Drawing Sheets

(56) References Cited

U.S. PATENT DOCUMENTS

| | | |
|---|---|---|
| 2005/0198412 A1 | 9/2005 | Pedersen et al. |
| 2007/0192585 A1 | 8/2007 | Briancon et al. |
| 2008/0289027 A1 | 11/2008 | Yariv et al. |
| 2009/0064309 A1 | 3/2009 | Boodaei et al. |
| 2009/0077375 A1 | 3/2009 | Anspach |
| 2014/0119727 A1 | 5/2014 | Ousley et al. |
| 2014/0157381 A1 | 6/2014 | Disraeli |
| 2014/0304773 A1 | 10/2014 | Woods et al. |
| 2015/0161370 A1 | 6/2015 | North et al. |
| 2015/0281225 A1 | 10/2015 | Schoen et al. |
| 2015/0363582 A1 | 12/2015 | Sheller et al. |
| 2016/0233946 A1 | 8/2016 | Wengrovitz et al. |
| 2016/0241523 A1 | 8/2016 | Ahn et al. |
| 2017/0193211 A1 | 7/2017 | Blake et al. |
| 2017/0242995 A1 | 8/2017 | Bassenye-Mukasa et al. |
| 2018/0041475 A1 | 2/2018 | Rai |
| 2018/0054312 A1 | 2/2018 | Kamal |
| 2018/0095900 A1 | 4/2018 | Sarangdhar et al. |
| 2021/0144150 A1* | 5/2021 | James ............... H04W 12/08 |
| 2022/0006812 A1* | 1/2022 | Rodriguez Bravo ................ H04L 63/105 |

OTHER PUBLICATIONS

"Equipping the Warfighter with Small Business Ingenuity," Phase III Desk Reference, V1.0, U.S. Air Force, 2016, p. 16 .. (Applicant points out, in accordance with MPEP 609.04(a), that the year of publication, 2016, is sufficiently earlier than the effective U.S. filing date, so that the particular month of publication is not in issue.).

"Gartner Says Worldwide Information Security Spending will Grow 7 Percent to Reach $86.4 Billion in 2017," accessed from gartner.com, Aug. 16, 2017, 4 pp.

"Harris Still in Neutral Zone," Zacks Equity Research, Feb. 13, 2012, 2 pp.

Joint Tactical Radio System, Wikipedia, the free encyclopedia, retrieved from https://en.wikipedia.org/wiki/Joint_Tactical_Radio_System, on Jan. 18, 2018, 9 pp.

"military Communications Market Worth USD 40.82 Billion by 2020," MarketWatch, Sep. 11, 2015, 2 pp.

"Military Tablet Wars: Windows Gaining on Apple," Kiosk Industry, Feb. 27, 2016, 1 pp.

"Multi-Factor Authentication," Wikipedia, the free encyclopedia, retrieved from https://en.wikipedia.org/wiki/Multi-factor_authentication, on Jan. 18, 2018, 8 pp.

"NYMI Band: Product Overview," Nymi, retrieved from https://nymi.com/product_overview, on Jan. 18, 2018, 2 pp.

"Technavio Says Global EEG and ECG Biometrics Market Will Reach $42.14 Million by 2020," Techanvio.com, Apr. 7, 2016, 2 pp.

De Renesse, "Virtual Digital Assistants to Overtake World Population by 2021," accessed from informa.com, May 17, 2017, 3 pp.

Keller, "ATCorp to build SWAP-Optimized Airborne Networking Router Prototypes for Carrier-Based Aircraft," Military and Aerospace Electronics, Jan. 19, 2017, 4 pp.

Lugovaya, "Biometric Human Identification Based on ECG," physionet.org, 2005, 9 pp. (Applicant points out, in accordance with MPEP 609.04(a), that the year of publication, 2005, is sufficiently earlier than the effective U.S. filing date, so that the particular month of publication is not in issue.).

* cited by examiner

SECURE AUTHENTICATION USING COMPANION TRUST

STATEMENT REGARDING FEDERALLY SPONSORED RESEARCH OR DEVELOPMENT

This invention was made with Government support under Contract FA8750-17-C-0286 awarded by the United States Air Force Research Lab. The Government may have certain rights in this invention.

TECHNICAL FIELD

The disclosure relates to user authentication.

BACKGROUND

A user in the field may be part of a team that includes a plurality of other users that work in concert with the user in order to accomplish a mission or other objective, and each user in the team may similarly have to authenticate with a respective computing device in order to unlock and access the respective computing device. Typically, each user in the team may enter a password or undergo biometric authentication, such as fingerprint recognition or facial recognition, in order to authenticate the user as an authorized user of a computing device and to unlock the computing device to access one or more functionalities of the computing device and/or one or more applications at the computing device.

SUMMARY

In general, this disclosure describes computing devices that utilize companion trust for controlling access to computing devices that are proximate to each other. Companion trust is a technique whereby a group of computing devices that are proximate to each may establish a level of trust between the computing devices, such that a computing device in the group of computing devices may, upon successful authenticating of the user of the computing device as an authorized user and unlocking the computing device, cause the other computing devices in the group of computing devices to also unlock.

In one example, the disclosure is directed to a method including authenticating, by a computing device, a user of the computing device as an authorized user; in response to authenticating the user of the computing device as the authorized user, transitioning, by the computing device, from a locked state to an unlocked state; in response to authenticating the user of the computing device as the authorized user, determining, by the computing device, one or more computing devices that are proximate to the computing device; and in response to determining the one or more computing devices that are proximate to the computing device, sending, by the computing device to each of the one or more computing devices, an indication of successful user authentication by the computing device to enable each of the one or more computing devices to transition from the locked state to the unlocked state without performing user authentication.

In another example, the disclosure is directed to a computing device comprising memory; and processing circuitry operably coupled to the memory and configured to: authenticate a user of the computing device as an authorized user; in response to authenticating the user of the computing device as the authorized user, transition from a locked state to an unlocked state; in response to authenticating the user of the computing device as the authorized user, determine one or more computing devices that are proximate to the computing device; and in response to determining the one or more computing devices that are proximate to the computing device, send to each of the one or more computing devices an indication of successful user authentication by the computing device to enable each of the one or more computing devices to transition from the locked state to the unlocked state without performing user authentication.

In another example, the disclosure is directed to a non-transitory computer readable storage medium storing instructions that, when executed by one or more processors of a computing device cause the one or more processors to: authenticate a user of the computing device as an authorized user; in response to authenticating the user of the computing device as the authorized user, transition from a locked state to an unlocked state; in response to authenticating the user of the computing device as the authorized user, determine one or more computing devices that are proximate to the computing device; and in response to determining the one or more computing devices that are proximate to the computing device, send to each of the one or more computing devices an indication of successful user authentication by the computing device to enable each of the one or more computing devices to transition from the locked state to the unlocked state without performing user authentication.

In another example, the disclosure is directed to an apparatus including means for authenticating a user of a computing device as an authorized user; means for, in response to authenticating the user of the computing device as the authorized user, transitioning from a locked state to an unlocked state; means for, in response to authenticating the user of the computing device as the authorized user, determining one or more computing devices that are proximate to the computing device; and means for, in response to determining the one or more computing devices that are proximate to the computing device, sending to each of the one or more computing devices an indication of successful user authentication by the computing device to enable each of the one or more computing devices to transition from the locked state to the unlocked state without performing user authentication The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
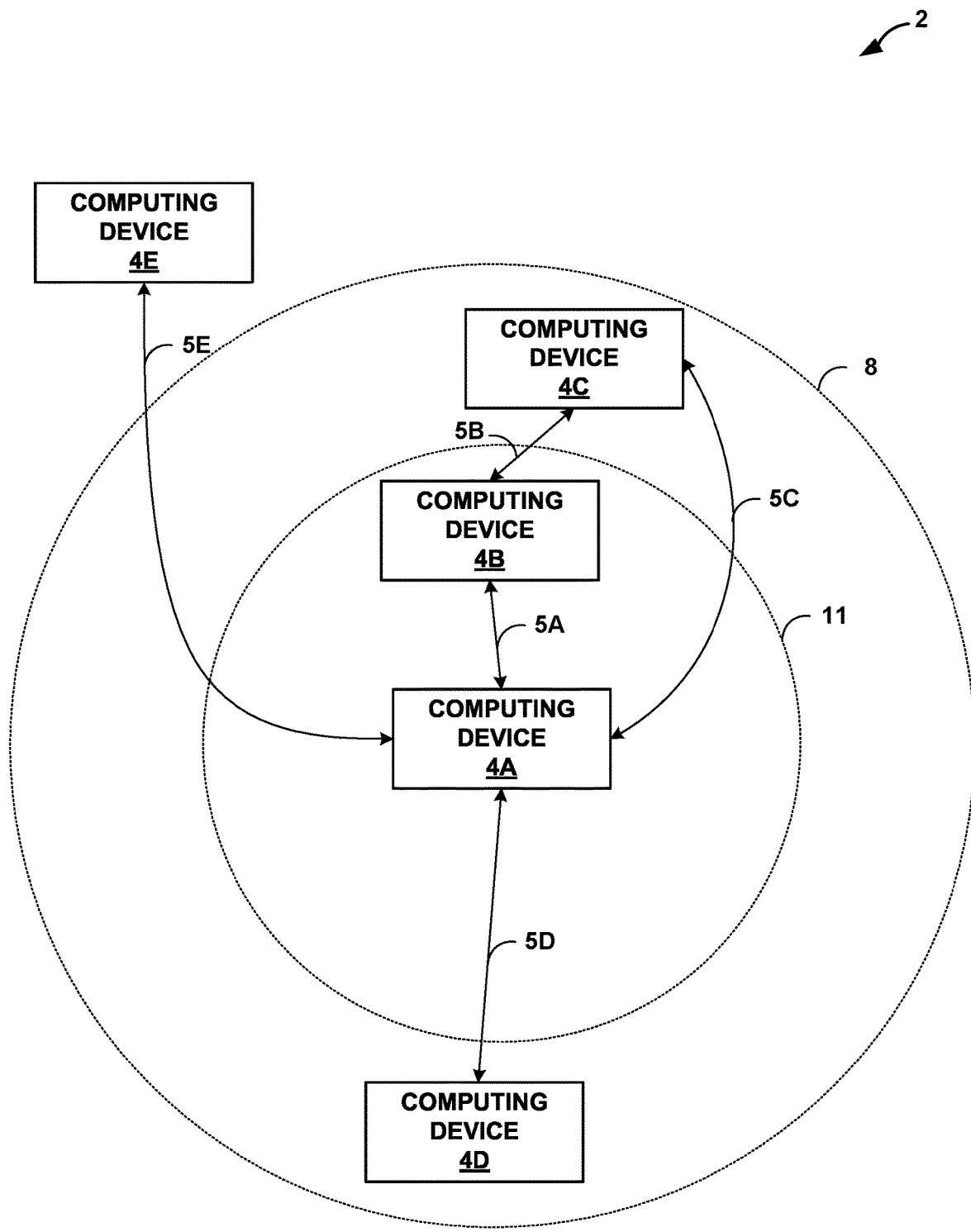
FIG. 1 is a block diagram illustrating an example system that includes a group of proximate client devices configured to perform companion trust, in accordance with one or more techniques of this disclosure.

In general, this disclosure describes techniques for a group of associated computing devices that are proximate to each other to perform companion trust to grant users of the computing devices access to the computing devices. Companion trust is a technique whereby a group of associated computing devices may trust each other if the computing devices in the group of computing devices are proximate (e.g., within a specified physical distance) to each other. Specifically, based on a computing device in the group of associated computing devices successfully authenticating the user of the computing device as an authorized user and transitioning the computing device from a locked state to an unlocked state to provide the authorized user access to one or more applications and/or functionalities of the computing device, the other computing devices in the group of associated computing devices may correspondingly transition from a locked state to an unlocked state.

A group of computing devices that are proximate to each other may be computing devices used by one or more associated users. For example, a user of a computing device may, in some instances use multiple computing devices, such that the computing devices used by the same user may be associated with each other. In another example, a plurality of users may be members of the same team, such as a squad, a platoon, a company, and the like, where the members of the team may work in concert with each other in order to accomplish a mission or other objective. Each user in the team may each use one or more computing devices, and the computing devices used by the members of the same team may be associated with each other.

A computing device may authenticate the user in order to determine whether the user is an authorized user of the computing device prior to granting the user access to the computing device (e.g., unlocking the computing device). For example, the computing device may require that the user enter a valid password in order to authenticate the user as an authorized user of the computing device. If a user is using multiple computing devices, each of the computing devices used by the user may require that the user enter a valid password in order to authenticate the user as an authorized user of the computing device.

However, requiring a user to enter a password may sometimes overly increase the user burden of a user who needs immediate access to the applications and functionalities of a computing device. For example, if a user in a hostile situation or a situation where the user must access computing device very quickly under pressure, it may be difficult for the user to quickly and accurately input a valid password at the computing device. Further, for a group of computing devices whose users are part of the same team, requiring each computing device in a group of computing devices to perform user authentication may overly increase the user burden of each member of the team and may potentially slow down or prevent the team from successfully completing a mission.

As such, the techniques of this disclosure describe companion trust techniques that enable a group of associated computing devices that are proximate to each other to provide access to applications and/or functionalities of the computing devices in the group of associated computing devices in ways that reduce the user burden of users, thereby providing one or more technical advantages. Specifically, when a computing device in the group of associated computing devices successfully authenticating the user of the computing device as an authorized user and transitions from a locked state to an unlocked state, the other computing devices in the group of associated computing devices may, in response to the computing device successfully authenticating the user of the computing device as an authorized user, correspondingly transition from a locked state to an unlocked state. In this way, computing device in the group of associated computing devices that are proximate to each other may each transition from a locked state to an unlocked state without each computing device in the group performing an authentication process to authenticate a user as an authorized user.

FIG. 1 is a block diagrams illustrating an example system 2 that includes a computing devices 4A-4E ("computing devices 4") configured to perform companion trust, in accordance with one or more techniques of this disclosure. As shown in FIG. 1, computing devices 4 may each be an end-user device (EUD). An EUD may be a mobile computing device such as a smartphone, a tablet computer, or a personal digital assistant (PDA), a wearable computing device such as a computerized watch (e.g., a smart watch), computerized eyewear, computerized headwear, or other types of wearable computing devices, a laptop computer, a media player, a television platform, an automobile navigation system, a digital camera, or any other type of mobile and/or non-mobile computing device that is configured to perform a media operation as described herein.

In the example of FIG. 1, each of computing devices 4 may require users of a computing device to be successfully authenticated as an authorized user of the computing device prior to allowing the users to access one or more applications at the computing device. For example, each of computing devices 4 may perform an authentication process, such as password authentication, biometric authentication (e.g., fingerprint recognition, facial recognition, voice recognition, etc.), or any other suitable authentication techniques, to authenticate users as an authorized user of the computing device.

Each of computing devices 4 may operate in an locked state and an unlocked state. A computing device may be in a locked state when the computing device has not authenticated a user of the computing device as an authorized user. The computing device may, while in the locked state, prevent the user of the computing device from accessing applications and information stored in the computing device and may prevent the user of the computing device from accessing the functionalities of the computing device. In some examples, a computing device in a locked state may not allow access to any of the applications and functionalities of the computing device. In other examples, a computing device in a locked state may allow access to a limited number of applications and functionalities of the computing device, where the limited number of applications and functionalities of the computing device may include fewer applications and functionalities of the computing device than can be accessed when the computing device is in the unlocked state.

A computing device may, upon successful authentication of the user of the computing device as an authorized user, such as when the user enters a valid password at the computing device or upon successful biometric authentication of the user as an authorized user, transition from the locked state to an unlocked state. When the computing device is in an unlocked state, the computing device may provide, to the authorized user, access to one or more applications at the computing device and/or one or more functionalities of the computing device that were not available to the users of the computing device in the locked state.

When a computing device is in the unlocked state, the computing device may transition back from the unlocked state to the locked state. For example, computing device may, after a period of inactivity, such as 30 seconds, 1 minute, and the like, lock the computing device by transitioning from the unlocked state to the locked state. In some examples, when the computing device is in an unlocked state, the computing device may perform continuous authentication of the user of the computing device, such as by periodically determining whether the user of the computing device is still an authorized user. For example, the computing device may, in response to determining that the user of the computing device is no longer an authorized user, transition from the unlocked state to the locked state, thereby preventing the user from continuing to access one or more applications at the computing device and/or one or more functionalities of the computing device.

As described above, a user in the field may, in some instances use multiple computing devices (e.g., two or more of computing devices 4), such that the user may have to authenticate with multiple computing devices in order to unlock and access each respective computing device. Further, a user in the field may be part of a team that includes a plurality of users that work in concert in order to accomplish a mission or other objective. Each user in the team may use one or more computing devices and each user in the team may similarly have to authenticate with a respective one or more computing devices in order to unlock and access the respective one or more computing devices.

In accordance with one or more techniques of this disclosure, in order to simplify the authentication procedures of computing devices while maintaining a high level of security, computing devices that are proximate to each other may utilize companion trust to control the access level granted by the computing devices to users. Companion trust is a technique whereby a group of computing devices that are proximate to each other may trust each other, such that the access level granted by each computing device in the group of computing devices may correspond to the highest access level granted by a computing device in the group of computing devices.

In general, two computing devices are proximate if the two computing devices are within a specified distance, such as within one meter, within five meters, within ten meters, and the like. In some examples, if two computing devices are connected via wireless networking, such as Wi-Fi or Bluetooth, the two computing devices may be proximate if the two computing devices are within wireless networking range (e.g., within range of the Wi-Fi or Bluetooth connections).

In some examples, a group of computing devices that are proximate to each other may perform the companion trust technique by, upon successful authentication of the user of a computing device in the group of computing devices as an authorized user and unlocking the computing device, causing other computing devices in the group of computing devices that are proximate to the computing device to also unlock. That is, when a computing device in the group of computing devices successfully authenticates the user of the computing device as an authorized user, such as via any of the authentication techniques described throughout this disclosure, and transitions the computing device from a locked state to an unlock state, the computing device may cause other computing devices in the group of computing devices that are proximate to the unlocked computing device to correspondingly unlock without performing additional authentication of users of the other computing devices in the group of computing devices, such as requiring the users to each enter a password into the other computing devices.

As shown in FIG. 1, computing devices 4A-4E may be a group of computing devices. Computing devices 4A-4E may be connected via wireless connections 5A-5E. Wireless connections 5A-5E may be any suitable wireless connection such as Wi-Fi, Bluetooth, Bluetooth Low Energy (BLE), and the like.

When each of computing devices 4A-4E is in a locked state, such as when none of computing devices 4A-4E has successfully authenticated a user as an authorized user of one of computing devices 4A-4E, computing device 4A may attempt to authenticate a user of computing device 4A as an authorized user, such as by authenticating a password entered by the user at computing device 4A or via any other suitable authentication technique. If computing device 4A successfully authenticates the user of computing device 4A as an authorized user, computing device 4A may transition from the locked state to an unlocked state, such as by enabling the user access to one or more applications at the computing device and/or one or more functionalities of the computing device that the user was not able to access when computing device 4A was in the locked state.

Computing device 4A may, in response to successfully authenticating the user of computing device 4A as an authorized user and unlocking computing device 4A, cause computing devices that are proximate to computing device 4A to correspondingly unlock by transitioning from the locked state to the unlocked state. As such, computing device 4A may, in response to successfully authenticating the user of computing device 4A as an authorized user and unlocking computing device 4A, determine whether one or more computing devices are proximate to computing device 4A. A computing device may be proximate to computing device 4A if the computing device is within a specified physical distance 8 from computing device 4A, such as within one meter, five meters, ten meters, and the like from computing device 4A.

Computing device 4A may determine whether one or more computing devices are proximate to computing device 4A via any suitable technique. For example, computing device 4A may determine whether one or more computing devices are proximate to computing device 4A based on location information associated with each of the one or more computing devices. Computing device 4A may, in response to successfully authenticating the user of computing device 4A as an authorized user, send a request for location information to each of computing devices (e.g., computing devices 4B-4E) that are wirelessly connected to computing device 4A. Computing devices 4B-4E may, in response to receiving the request for location information, each send associated location information, such as global positioning system (GPS) information generated by the respective computing devices 4B-4E, to computing device 4A. Computing device 4A may therefore determine, based at least in part on the location information received from computing devices 4B-4E, whether computing devices 4B-4D are proximate to computing device 4A. For example, computing device 4A may determine, based on the location information received from computing devices 4B-4E that computing devices 4B-4D are each proximate to computing device 4A by being closer to computing device 4A than physical distance 8, but that computing device 4E is not proximate to computing device 4A because computing device 4E is further away from computing device 4A than distance 8.

In some examples, instead of sending a request for location information in response to successfully authenticating the user of computing device 4A as an authorized user, computing device 4A may periodically exchange location information with computing devices 4B-4E that are wirelessly connected to computing device 4A, and may store the most recently received location information associated with computing devices 4B-4E. As such, computing device 4A may, in response to successfully authenticating the user of computing device 4A as an authorized user, computing device 4A, determine, based on the most recently received location information associated with computing devices 4B-4E, whether computing devices 4B-4E are proximate to computing device 4A. For example, computing device 4A may determine, based on the location information received from computing devices 4B-4E, that computing devices 4B-4D are each proximate to computing device 4A, but that computing device 4E is not proximate to computing device 4A.

In some examples, computing device 4A may determine whether each of the one or more computing devices proximate to computing device 4A is associated with computing device 4A. A computing device may be associated with computing device 4A if the computing device and computing device 4A are used by members of the same team, such as being members of the same squad, a platoon, a company, and the like.

Computing device 4A may store in memory identifiers of computing devices associated with computing device 4A, such as the International Mobile Equipment Identity (IMEI) of each computing device associated with computing device 4A. Computing device 4A may, in response to determining that one or more computing devices are proximate to computing device 4A, send, to each of the one or more computing devices, a request for the computing device's identifier. For example, computing device 4A may send to each of computing devices 4B-4D proximate to computing device 4A, a request for the computing device's identifier.

Computing device 4A may receive a respective identifier from each of the one or more computing devices proximate to computing device 4A. For example, computing device 4A may receive, from each of computing devices 4B-4D, the identifier of the computing device. Computing device 4A may compare the identifier received from each of the one or more computing devices with the identifiers of computing devices associated with computing device 4A stored in memory to determine, out of the one or more computing devices are proximate to computing device 4A, one or more computing devices that are associated with computing device 4A. For example, computing device 4A may, based on comparing the identifiers received from each of computing devices 4B-4D with the identifiers of computing devices associated with computing device 4A stored in memory, that computing devices 4B and 4C are associated with computing device 4A, but that computing device 4D is not associated with computing device 4A. As such, computing device 4A may determine that computing devices 4B and 4C and proximate computing devices that are associated with computing device 4A.

Computing device 4A may, in response to determining that one or more computing devices associated with computing device 4A are proximate to computing device 4A, send, to each of the one or more computing devices, an indication of successful user authentication by computing device 4A to enable each of the one or more computing devices (e.g., computing devices 4B and 4C) that are proximate to computing device 4A to transition from the locked state to the unlocked state without performing user authentication. For example, if computing device 4A determines that computing devices 4B and 4C are associated with computing device 4A and are proximate to computing device 4A, computing device 4A may send, via wireless network 5A to computing device 4B an indication of successful user authentication by computing device 4A to cause computing device 4B to transition from the locked state to the unlocked state, and may send, via wireless network 5C to computing device 4C, an indication of successful user authentication by computing device 4A to cause computing device 4C to transition from the locked state to the unlocked state.

The indication of successful user authentication sent by computing device 4A to a proximate computing device may be one or more data packets that, when received by the proximate computing device, causes the proximate computing device to transition from a locked state to an unlocked state. For example, the indication of successful user authentication may include a command to transition from a locked state to an unlocked state and the proximate computing device may, in response to receiving the command, perform the command to transition the proximate computing device from a locked state to an unlocked state.

Computing device 4A may generate and/or send the indication of successful user authentication in ways that prove that computing device 4A is authorized to send the indication of successful user authentication. Being able to prove that computing device 4A is authorized to send the indication of successful user authentication may prevent malicious parties from attempting to remotely unlock computing devices by sending to the computing devices indication of successful user authentication.

In some example, computing device 4A may include, in the indication of successful user authentication, an identifier associated with computing device 4A, such as the IMEI of computing device 4A. A computing device proximate to computing device 4A, such as computing device 4B or computing device 4C, may, in response to receiving the indication of successful user authentication, determines whether the identity of computing device 4A matches the identity of an associated computing device out of the identifies of associated computing devices stored in memory of computing devices 4B and 4C. If the identity of computing device 4A matches the identity of an associated computing device, the computing device may determine that computing device 4A is authorized to send the indication of successful user authentication, and may accordingly transition the respective computing device from a locked state to an unlocked state.

In some example, computing device 4A may utilize a shared secret between computing devices 4A-4C to authenticate the indication of successful user authentication sent by computing device 4A. For example, if computing devices 4A-4C share a secret cryptographic key, computing device 4A may encrypt the indication of successful user authentication that is sent to computing device 4B and 4C using the shared secret cryptographic key. Each of computing devices 4B and 4C may, in response to receiving the indication of successful user authentication, attempt to decrypt the indication of successful user authentication using the shared secret cryptographic key. If computing devices 4B and 4C are each able to successfully decrypt the indication of successful user authentication using the shared secret cryptographic key, each of computing devices 4B and 4C may determine that the received indication of successful user authentication was sent from a computing device that was authorized to send the indication of successful user authentication, and may accordingly transition the respective computing device from a locked state to an unlocked state.

Computing devices 4B and 4C may, in response to receiving the indication of successful user authentication from computing device 4A, transition from a locked state to an unlocked state. Transitioning from the locked state to the unlocked state enables computing devices 4B and 4C to provide users access to functionalities and/or applications that were inaccessible in the locked state.

When in the unlocked state, a computing device may determine an access level to provide to the user of the computing device out of a plurality of different access levels that may be provided by the computing device to the user. An access level may correspond to the number or set of functionalities of the computing device and/or applications at the computing device that the computing devices allows the user to access. In general, a computing device may, at a relatively lower access level, provide access to relatively fewer applications at the computing device and/or relatively fewer functionalities of the computing device compared with the computing device a relatively higher access level. At the highest access level, the computing device may be completely unlocked, thereby providing access to all of the applications at the computing device and all of the functionalities of the computing device to the user of the computing device.

In some examples, a computing device may determine the access level to provide to a user based on the number of authentication factors used to authenticate the user as an authorized user. For example, a computing device, such as computing device 4A, may, in response to successfully authenticating the user using a first authentication factor, such as by the user entering a valid password, unlock computing device 4A and provide a first access level of computing device 4A to the user. If computing device 4A subsequently authenticates the user using a second authentication factor, such as by using biometric authentication, computing device 4A may, in response to successfully authenticating the user using the second authentication factor, provide a second access level of computing device 4A to the user, where the second access level may provide access to relatively more applications at computing device 4A and/or relatively more functionalities of computing device 4A to the user compared with the first access level.

In cases where each of computing devices 4 may be able to provide a plurality of different access levels while in an unlocked state, computing device 4A may be able to control the access level provided by computing devices (e.g., computing devices 4B and 4C) that are proximate to computing device 4A. Computing device 4A may enable computing devices 4B and 4C to provide the same, higher, or lower access level than provided by computing device 4A, and may control the access level provided by computing devices 4B and 4C. For example, computing device 4A may enable computing devices 4B and 4C to provide any access level, up to completely unlocking (e.g., provided the highest access level) computing devices 4B and 4C.

To control the access level provided by computing devices 4B and 4C that are proximate to computing device 4A, computing device 4A may, in response to successfully authenticating the user of computing device 4A as an authorized user, send to computing devices 4B and 4C an indication of the access level to be provided by computing devices 4B and 4C. Computing devices 4B and 4C may, in response to receiving the indication of the access level, provide the access level to users of computing devices 4B and 4C as indicated. In some examples, if computing device 4A does not send an indication of the access level to be provided, computing devices 4B and 4C may provide a default access level.

In some examples, computing device 4A may determine the access level to be provided by a computing device that is proximate to computing device 4A based at least in part on the distance between computing device 4A and the computing device. For example, computing device 4A may determine that a computing device that is relatively closer to computing device 4A may provide a relatively higher access level than a computing device that is relatively further away from computing device 4A.

In the example of FIG. 1 where computing devices 4B and 4C are proximate to computing device 4A, computing device 4A may determine the physical distance between computing devices 4A and 4B and the physical distance between computing devices 4A and 4C. If computing device 4A determines that the physical distance between computing devices 4A and 4B is less than the physical distance between computing devices 4A and 4C, computing device 4A may send, to computing device 4B, an indication of a first access level to be provided by computing devices 4B, and may send, to computing device 4C, an indication of a second access level to be provided by computing devices 4C, where the first access level is higher than the second access level.

In some examples, computing device 4A may, based at least in part on the distance between computing device 4A and a computing device, enable the computing device to completely unlock (i.e., provide the highest access level to the user). For example, if computing device 4A determines that a computing device is physically at a very close distance from computing device 4A, computing device 4A may enable the computing device to completely unlock. For example, two computing devices may be physically at a very close distance from each other if the two computing devices are within a specified physical distance 11 from each other, such as if the two computing devices are no more than two feet away from each other, no more than one meter away from each other, and the like.

In the example of FIG. 1 where computing devices 4B and 4C are proximate to computing device 4A, computing device 4A may determine whether the physical distance between computing devices 4A and 4B and the physical distance between computing devices 4A and 4C are each within a specified physical distance 11 to computing device 4A, where physical distance 11 may specify a physical distance that is closer to computing device 4A than physical distance 8 used for determining whether computing devices are proximate to computing device 4A. If computing device 4A determines that the physical distance between computing devices 4A and 4B is within the specified physical distance 11, computing device 4A may determine that computing device 4B may provide the highest level of access to the user of computing device 4B and may send, to computing device 4B, an indication that computing device 4B is to provide the highest level of access to the user of computing device 4B. Further, if computing device 4A determines that the physical distance between computing devices 4A and 4C is not within the specified physical distance 11, computing device 4A may determine that computing device 4C may not provide the highest level of access to the user of computing device 4C, and may send, to computing device 4C, an indication that computing device 4C is to provide a level of access to the user of computing device 4C that is lower than the highest level of access.

In some examples, a computing device may perform continuous verification of the user of the computing device when the computing device is in an unlocked state by periodically determining that the computing device is still being used by an authorized user. For example, the computing device may continuously determine whether the computing device has received user input, such as touch gestures at a presence-sensitive display of the computing device, movement of the computing device sensed by motion sensors of the computing device, and the like, within a specified timeout period, which may be the previous one minute, the previous five minutes, and the like. If the computing device determines that the computing device has not received user input within the specified timeout period, the computing device may determine that the computing device is no longer being used by an authorized user and may transition from the unlocked state to the locked state.

In some examples, a computing device may perform continuous authentication by continuing to periodically determine whether the computing device is still being used by an authorized user, such as by periodically requesting that the user of the computing device enter a password, periodically performing biometric authentication (e.g., fingerprint recognition or facial recognition) on the user of the computing device, and the like. If the host is able to authenticate the user of the computing device as an authorized user, the computing device may remain in the unlocked state. However, if the host is unable to authenticate the user of the computing device as an authorized user, the computing device may transition from the unlocked state to the locked state.

In examples where a group of computing devices performs the techniques of companion trust to unlock the computing devices in the group in response to one of the computing devices in the group successfully authenticating the user of the computing device as an authorized user, the group of computing devices may also use the techniques of companion trust to handle continuous authentication of the group of computing devices. Specifically, only a single computing device may have to perform continuous verification of the user of the computing device as an authorized user in order for all of the computing devices in the group to remain in the unlocked state.

In the example of FIG. 1, where computing device 4A transitioning from the locked state to the unlocked state causes computing devices 4B and 4C proximate to computing device 4A to correspondingly transition from the locked state to the unlocked state, computing device 4A may perform continuous authentication to continually verify that the user of computing device 4A is an authorized user. Computing device 4A may, in response to successfully authenticating the user of computing device 4A as part of continuous authentication, remain in the unlocked state instead of transitioning to the locked state. Computing device 4A may, in response to successfully authenticating the user of computing device 4A as part of continuous authentication, send to each of computing devices 4B and 4C an indication that the user of computing device 4A has been authenticated as an authorized user. The indication that the user of computing device 4A has been authenticated as an authorized user may cause computing devices 4B and 4C, when in the unlocked state, to remain unlocked without having to perform continuous authentication of the users of computing devices 4B and 4C.

In some examples, computing device 4B and 4C may, when in the unlocked state, perform continuous authentication by continuously determining whether computing device 4A is unlocked. For example, computing device 4B performs continuous authentication by determining whether computing device 4B has received user input within a specified timeout period. If computing device 4B has received user input within a specified timeout period, computing device 4B may remain in the unlocked state.

If computing device 4B determines that computing device 4B has not received user input within a specified timeout period, computing device 4B may determine whether to remain in the unlocked state or whether to transition to the locked state based on whether computing device 4A is in an unlocked state. For example, computing device 4B may send, to computing device 4A, a query regarding whether computing device 4A is in the unlocked state and may, in response, receive an indication of whether the computing device is in the unlocked state. If computing device 4A determines that computing device 4A is in the unlocked state, computing device 4B may remain in the unlocked state. Conversely, if computing device 4A determines that computing device 4A is in the locked state, computing device 4B may transition to the locked state.

Figure 2:
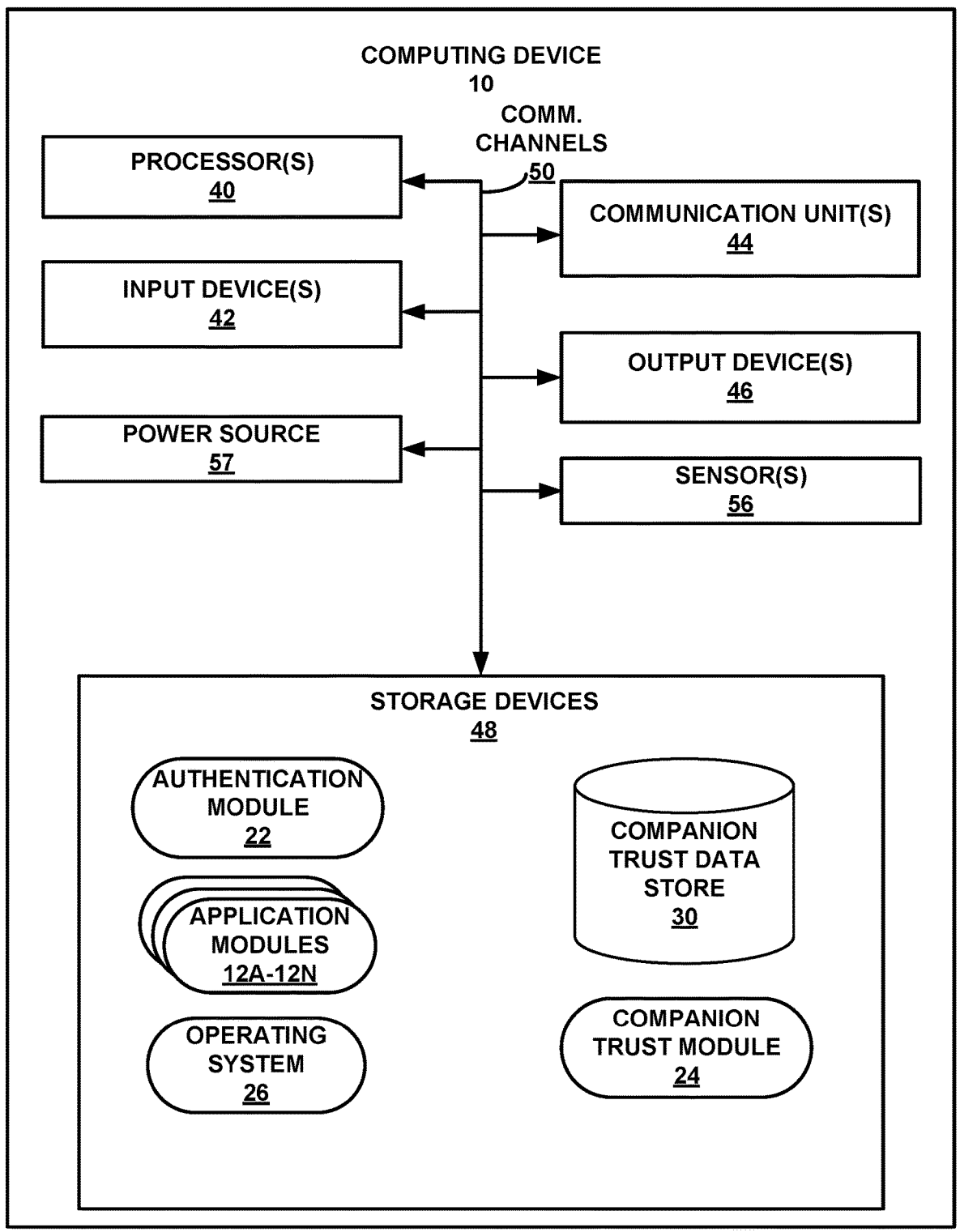
FIG. 2 is a block diagram illustrating an example computing device, in accordance with one or more aspects of the present disclosure.

FIG. 2 is a block diagram illustrating an example computing device, in accordance with one or more aspects of the present disclosure. Computing device 10 illustrated in FIG. 2 may be an example of any of computing devices 4A-4E of FIG. 1. FIG. 2 illustrates only one particular example of computing device 10, and many other examples of computing device 10 may be used in other instances and may include a subset of the components included in example computing device 10 or may include additional components not shown in FIG. 2.

As shown in the example of FIG. 2, computing device 10 includes one or more processors 40, one or more input devices 42, one or more communication units 44, one or more output devices 46, one or more storage devices 48, and one or more sensors 56. Storage devices 48 of computing device 10 also include authentication module 20, application modules 12A-12N, operating system 26, companion trust module 24, and companion trust data store 30. Communication channels 50 may interconnect each of the components 40, 42, 44, 46, 48, and 56 for inter-component communications (physically, communicatively, and/or operatively). In some examples, communication channels 50 may include a system bus, a network connection, one or more inter-process communication data structures, or any other components for communicating data between hardware and/or software.

One or more processors 40 may implement functionality and/or execute instructions within computing device 10. For example, processors 40 on computing device 10 may receive and execute instructions stored by storage devices 48 that provide the functionality of authentication module 20, application modules 12A-12N, operating system 26, companion trust module 24, and companion trust data store 30. These instructions executed by processors 40 may cause computing device 10 to store and/or modify information, within storage devices 48 during program execution. Processors 40 may execute instructions of authentication module 20, application modules 12A-12N, operating system 26, companion trust module 24, and companion trust data store 30. That is, authentication module 20, application modules 12A-12N, operating system 26, companion trust module 24, and companion trust data store 30 may be operable by processors 40 to perform various functions described herein.

One or more input devices 42 of computing device 10 may receive input. Examples of input are tactile, audio, kinetic, and optical input, to name only a few examples. Input devices 42 of computing device 10, in one example, include a mouse, keyboard, voice responsive system, video camera, buttons, control pad, microphone or any other type of device for detecting input from a human or machine. In some examples, input device 42 may be a presence-sensitive input device, which may include a presence-sensitive screen, touch-sensitive screen, etc.

One or more output devices 46 of computing device 10 may generate output. Examples of output are tactile, audio, and video output. Output devices 46 of computing device 10, in one example, include a presence-sensitive screen, sound card, video graphics adapter card, speaker, cathode ray tube (CRT) monitor, liquid crystal display (LCD), or any other type of device for generating output to a human or machine. Output devices 46 may include display devices such as cathode ray tube (CRT) monitor, liquid crystal display (LCD), Light-Emitting Diode (LED) or any other type of device for generating tactile, audio, and/or visual output.

One or more communication units 44 of computing device 10 may communicate with external devices by transmitting and/or receiving data. For example, computing device 10 may use communication units 44 to transmit and/or receive radio signals on a radio network such as a cellular radio network. In some examples, communication units 44 may transmit and/or receive satellite signals on a satellite network such as a Global Positioning System (GPS) network. Examples of communication units 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers and the like.

One or more storage devices 48 within computing device 10 may store information for processing during operation of computing device 10. In some examples, storage device 48 is a temporary memory, meaning that a primary purpose of storage device 48 is not long-term storage. Storage devices 48 on computing device 10 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with authentication module 20, application modules 12A-12N, operating system 26, companion trust module 24, and companion trust data store 30.

As shown in FIG. 2, computing device 10 may include one or more sensors 56. Sensors 56 may include an accelerometer that generates accelerometer data. Accelerometer data may indicate an acceleration and/or a change in acceleration of computing device 10. Sensors 56 may include a gyrometer that generates gyrometer data. Gyrometer data may indicate a physical orientation and/or change in physical orientation of computing device 10. In some examples, the orientation may be relative to one or more reference points. Sensors 56 may include a magnetometer that generates magnetometer data. Magnetometer data may indicate the magnetization of an object that is touching or in proximity to computing device 10. Magnetometer data may indicate the Earth's magnetic field, and in some examples, provide directional functionality of a compass. Sensors 56 may include an ambient light sensor that generates ambient light data. The ambient light data may indicate an intensity of light to which computing device 10 is exposed. Sensors 56 may include a proximity sensor that generates proximity data. Proximity data may indicate whether an object is within proximity to computing device 10. In some examples, proximity data may indicate how close an object is to computing device 10. In some examples, sensors 56 may include a clock that generates a date and time. The date and time may be a current date and time.

As shown in FIG. 2, computing device 10 may include a power source 57 In some examples, power source 57 may be a battery. Power source 57 may provide power to one or more components of computing device 10. Examples of power source 57 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 57 may have a limited capacity (e.g., 1000-3000 mAh).

In accordance with techniques of the disclosure, computing device 10 may include one or more processors 40 that are configured to execute authentication module 22 to authenticate the user of computing device 10 as an authorized user of computing device 10. For example, one or more processors 40 may be configured to execute authentication module 22 to perform password authentication by determining whether a password received at one or more input devices 42 is a valid password for an authorized user of computing device 10 and may, in response to determining that the password received at one or more input devices 42 is a valid password for an authorized user of computing device 10, determine that the user of computing device 10 as an authorized user and may therefore unlock computing device 10 by transitioning computing device from a locked state to an unlocked state.

In another example, one or more processors 40 may be configured to execute authentication module 22 to perform biometric authentication, such as fingerprint authentication, facial recognition, voice recognition, and the like, using one or more sensors 56 to capture biometric characteristics of a user to determine whether the captured biometric characteristics of the user matches that of an authorized user of computing device 10. One or more processors 40 may, in response to determining that the captured biometric characteristics of the user matches that of an authorized user of computing device 10, be configured to execute authentication module 22 determine that the user of computing device 10 as an authorized user and may therefore unlock computing device 10 by transitioning computing device 10 from a locked state to an unlocked state.

One or more processors 40 are further configured to execute companion trust module 24 to perform companion trust with a group of devices that are proximate to each other. For example, one or more processors 40 may, in response to successfully determining that the user of computing device 10 as an authorized user, be configured to execute companion trust module 24 to unlock associated computing devices that are proximate to computing device 10.

One or more processors 40 may be configured to, in response to successfully determining that the user of computing device 10 as an authorized user, execute companion trust module 24 to determine whether one or more associated computing devices are proximate to computing device 10. For example, one or more processors 40 may be configured to execute companion trust module 24 to send, via one or more communication units 44, a request for location information to each computing device that is wirelessly connected to computing device 10 and to determine, based on the location information received, via one or more communication units 44, from each of the computing devices wirelessly connected to computing device 10, one or more computing devices that are proximate to computing device 10.

In another example, one or more processors 40 may be configured to execute companion trust module 24 to use time of flight to determine the distance between computing device 10 and each computing device wirelessly connected to computing device 10. For example, one or more processors 40 may be configured to execute companion trust module 24 to send, via one or more communication units 44 to each computing device wirelessly connected to computing device 10, one or more packets, and may measure the time period from sending the one or more packets until the one or more packets are received back at computing device 10 via one or more communication units 44. One or more processors 40 may therefore be configured to execute companion trust module 24 to determine, based on the time of flight of the one or more packets sent to each computing device wirelessly connected to computing device 10, the distance between computing device 10 and the one or more computing devices, thereby determining one or more computing devices that are proximate to computing device 10.

In some examples, instead of sending a request for location information in response to successfully authenticating the user of computing device 10 as an authorized user, one or more processors 40 may be configured to execute companion trust module 24 to periodically exchange location information, via one or more communication units 44, with one or more computing devices that are wirelessly connected to computing device 10, and may store the most recently received location information associated with each of the one or more computing devices in, for example, companion trust data store 30. As such, one or more processors 40 may, in response to successfully authenticating the user of computing device 10 as an authorized user, be configured to execute companion trust module 24 to determine, based on the most recently received location information associated with each of the one or more computing devices, whether each of the one or more computing devices are proximate to computing device 10.

One or more processors 40 may be configured to execute companion trust module 24 to determine whether each of the one or more computing devices proximate to computing device 10 is associated with computing device 10. A computing device may be associated with computing device 10 if the computing device and computing device 10 are used by members of the same team, such as being members of the same squad, a platoon, a company, and the like.

Computing device to may store identifiers of computing devices associated with computing device 10, such as the IMEI of each computing device associated with computing device 10, in companion trust data store 30. One or more processors 40 may be configured to execute companion trust module 24 to determine, based on the identifiers stored in companion trust data store 30, whether each of the one or more computing devices proximate to computing device 10 has an identifier that matches an identifier stored in companion trust data store 30 to determine whether each of the one or more computing devices proximate to computing device 10 is associated with computing device 10. In this way, computing device 10 may determine one or more computing devices proximate to computing device 10 that are associated with computing device 10.

One or more processors 40 may, in response to determining that one or more computing devices associated with computing device 10 are proximate to computing device 10, be configured to execute companion trust module 24 to send, to each of the one or more computing devices via one or more communication units 44, an indication of successful user authentication by computing device 10 to enable each of the one or more computing devices that are proximate to computing device 10 to transition from the locked state to the unlocked state without performing user authentication. One or more processors 40 may be configured to execute companion trust module 24 to send the indication of successful user authentication by computing device 10 in ways that prove that computing device 10 is authorized to send the indication of successful user authentication. For example, the indication of successful user authentication may include an identifier associated with computing device 10, such as the IMEI of computing device 10, or one or more processors 40 may be configured to execute companion trust module 24 to encrypt the indication of successful user authentication with a shared cryptographic key, in order to securely transmit the indication of successful user authentication to one or more computing devices associated with computing device 10 are proximate to computing device 10.

In addition to sending an indication of successful user authentication, computing device 10 may also be configured to specify the access level to be provided by each of one or more computing devices associated with computing device 10 that are proximate to computing device 10 by sending, to each of one or more computing devices associated with computing device 10 that are proximate to computing device 10, an indication of the access level to be provided. Computing device 10 may determine the access level to be provided by a computing device that is proximate to computing device in many ways, such as based on the access level of computing device 10, the distance between computing device 10 and the computing device, and the like.

In cases where computing device 10 performs continuous verification of the user of computing device 10, computing device 10 may be configured to, upon successfully performing continuous verification of the user of computing device 10 as an authorized user, enable one or more computing devices associated with computing device 10 that are proximate to computing device 10 to remain unlocked. One or more processors 40 may be configured to, in response to successfully authenticating the user of computing device 10 as part of continuous authentication, send to each of one or more computing devices associated with computing device 10 that are proximate to computing device 10 an indication that the user of computing device 10 has been authenticated as an authorized user. The indication that the user of computing device 10 has been authenticated as an authorized user may cause each of one or more computing devices associated with computing device 10 that are proximate to computing device 10, when in the unlocked state, to remain unlocked without having to perform continuous authentication of the users of the one or more computing devices.

In some examples, computing device 10 may, when in a locked state, receive an indication of successful user authentication from an associated computing device that is proximate to computing device 10. The indication of successful user authentication received by computing device 10 may cause computing device 10 to unlock if the indication of successful user authentication is sent from an associated computing device that is proximate to computing device 10. Thus, one or more processors 40 may be configured to, in response to receiving the indication of successful user authentication, execute companion trust module 24, verify the indication of successful user authentication was sent by an associated computing device to determine whether to unlock computing device 10 in response to receiving the indication of successful user authentication.

In some examples, the indication of successful user authentication may be encrypted, and computing device 10 may be able to verify that the indication of successful user authentication was sent by an associated computing device by successfully decrypting the indication of successful user authentication using a shared cryptographic key stored in companion trust data store 30. As such, one or more processors 40 may be configured to execute companion trust module 24 to decrypt the indication of successful user authentication using a shared cryptographic key stored in companion trust data store 30. If the indication of successful user authentication is able to be successfully decrypted using the shared cryptographic key, the computing device 10 may be able to verify that the indication of successful user authentication was sent by an associated computing device.

In some examples, the indication of successful user authentication may include an identifier associated with the sender of the indication of successful user authentication, and computing device 10 may be able to verify that the indication of successful user authentication was sent by an associated computing device by determining whether the identifier associated with the sender matches an identifier of a computing device associated with computing device 10 stored in companion trust data store 30. As such, one or more processors 40 may be configured to execute companion trust module 24 to determine whether the identifier associated with the sender matches an identifier of a computing device associated with computing device 10 stored in companion trust data store 30. If the identifier associated with the sender matches an identifier of a computing device associated with computing device 10 stored in companion trust data store 30, the computing device 10 may be able to verify that the indication of successful user authentication was sent by an associated computing device.

Computing device 10 may, in response to verifying that the indication of successful user authentication was sent by an associated computing device, unlock computing device 10. If the indication of successful user authentication specifies an access level, computing device 10 may set the access level of computing device 10 to the access level specified by the indication of successful user authentication.

In cases where computing device 10 performs continuous authentication, computing device 10 may transition computing device 10 from an unlocked state to a locked state if computing device 10 has not received user input (e.g., at one or more input devices 42) within a specified timeout period. If computing device 10 is unlocked due to receiving the indication of successful user authentication specifies an access level, computing device 10 may, in response to not receiving user input within a specified timeout period, send a query to the computing device that sent the indication of successful user authentication regarding whether the computing device is in a unlocked state. Computing device 10 may, in response, receive an indication of whether the computing device is in the unlocked state. If computing device 10 receives an indication that the computing device is in the unlocked state, computing device 10 may remain in the unlocked state. However, if computing device receives an indication that the computing device is in the locked state, computing device 10 may transition from the unlocked state to the locked state.

Figure 3:
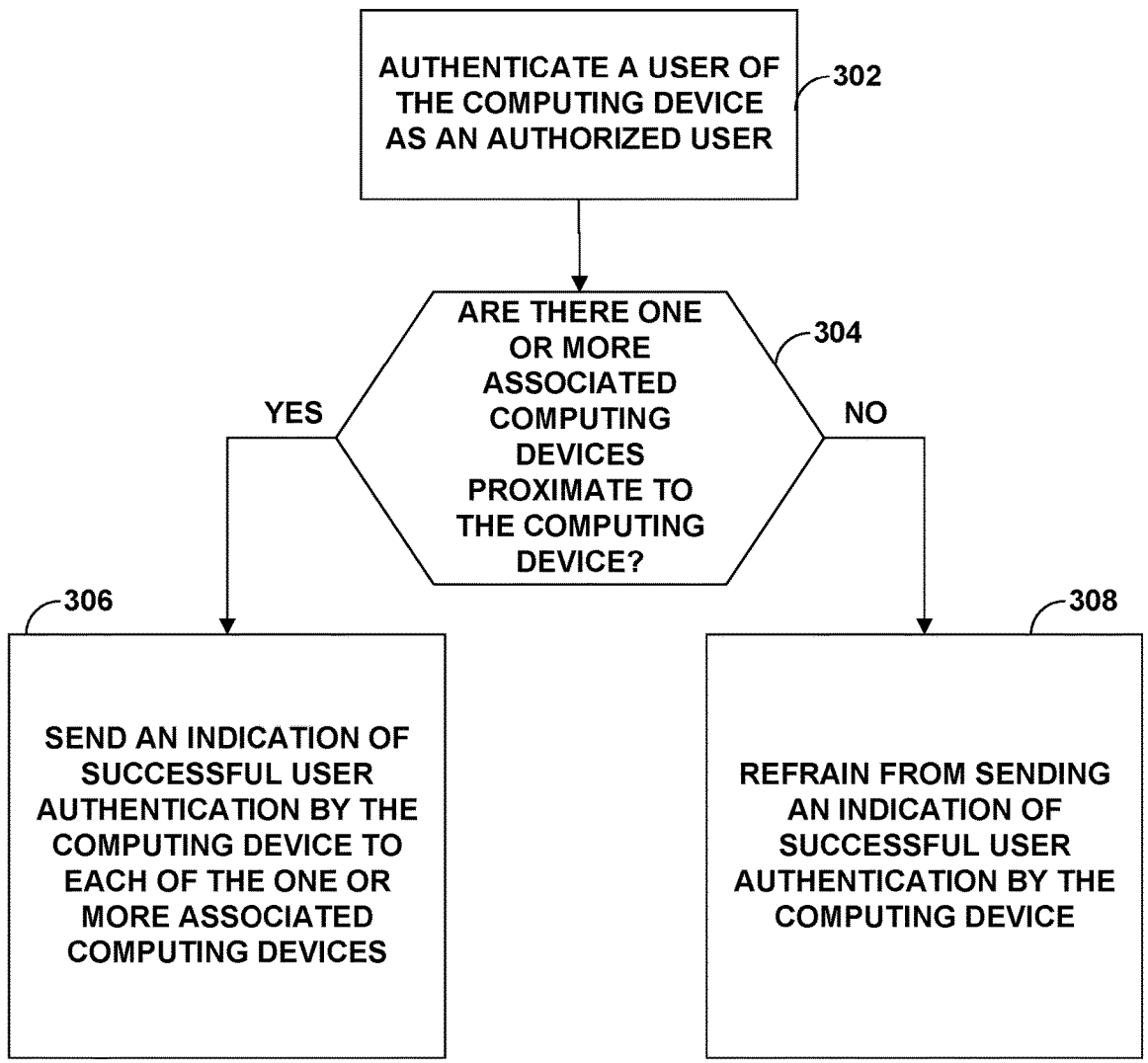
FIG. 3 is a flow diagram illustrating example operations of a computing device that implements companion trust authentication techniques in accordance with one or more aspects of this disclosure.

FIG. 3 is a flow diagram illustrating example operations of a computing device that implements companion trust authentication techniques in accordance with one or more aspects of this disclosure. The techniques of FIG. 3 may be performed by one or more processors of a computing device, such as any of computing devices 4A-4E of FIG. 1 and computing device 10 of FIG. 2. For purposes of illustration only, the techniques of FIG. 3 are described within the context of computing device 10 of FIG. 2, although computing devices having configurations different than that of computing device 10 of FIG. 2 may perform the techniques of FIG. 3.

As shown in FIG. 3, computing device 10 may authenticate a user of computing device 10 as an authorized user (302) and may, upon successful authentication of the user as an authorized user, unlock computing device 10 by transitioning from a locked state to an unlocked state. Computing device 10 may, in response to authenticating the user of computing device 10 as an authorized user, determine whether one or more associated computing devices are proximate to computing device 10 (304). Computing device 10 may determine whether one or more associated computing devices are proximate to computing device 10 via any suitable technique described herein, such as based on the location information associated with computing devices associated with computing device 10.

If computing device 10 determines that one or more associated computing devices are proximate to computing device 10, computing device 10 may unlock each of the one or more associated computing devices are proximate to computing device 10, such as by sending, to each of the one or more associated computing devices proximate to computing device 10, an indication of successful user authentication by computing device 10 that, when received by each of the one or more associated computing devices, causes each of the one or more associated computing devices to unlock by transitioning from a locked state to an unlocked state (306). If computing device 10 determines that no associated computing devices are proximate to computing device 10, computing device 10 may refrain from sending an indication of successful user authentication by computing device 10 to any computing devices (308).

Figure 4:
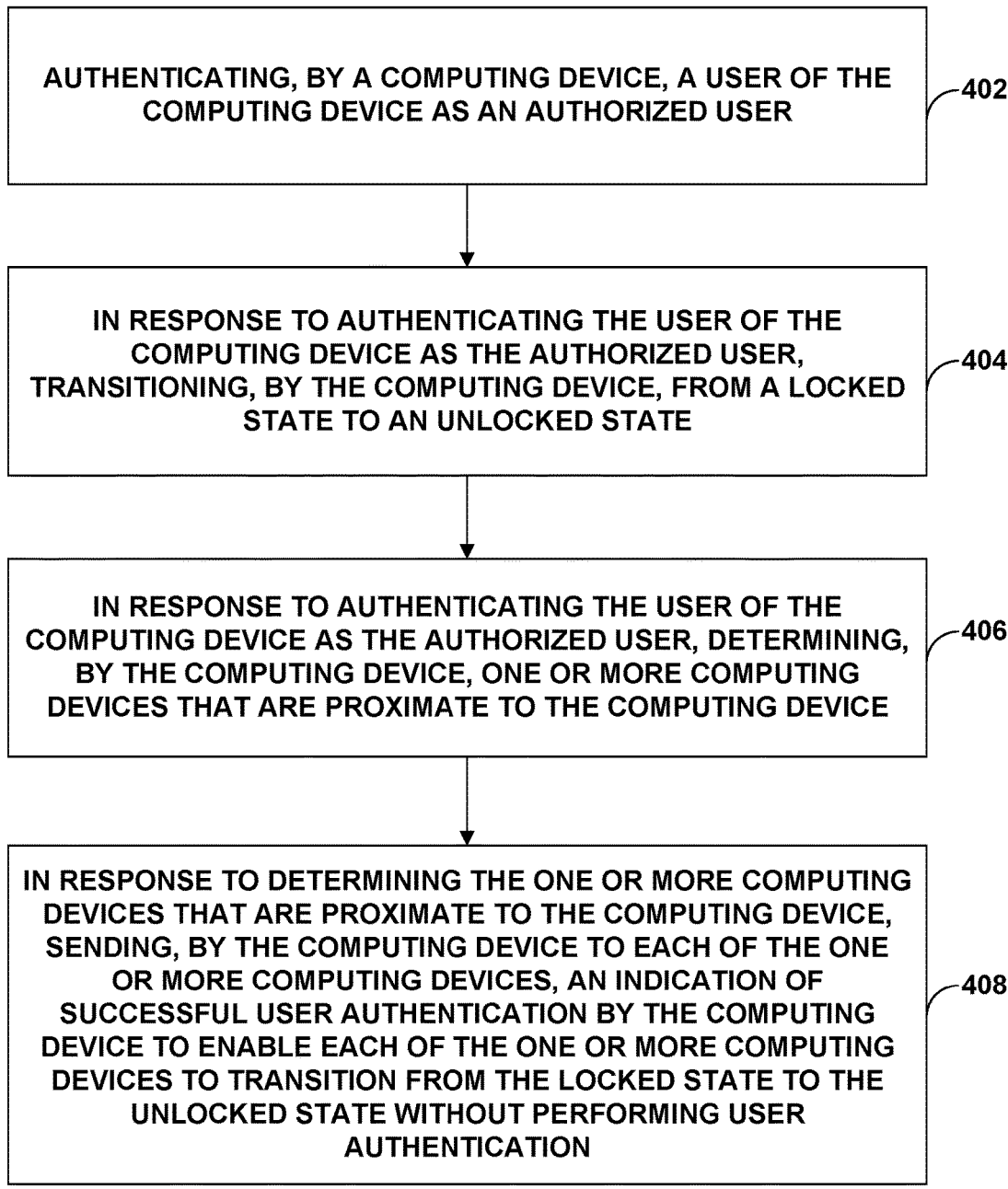
FIG. 4 is a flow diagram illustrating example operations of a computing device that implements companion trust authentication techniques in accordance with one or more aspects of this disclosure.

FIG. 4 is a flow diagram illustrating example operations of a computing device that implements companion trust authentication techniques in accordance with one or more aspects of this disclosure. The techniques of FIG. 4 may be performed by one or more processors of a computing device, such as any of computing devices 4A-4E of FIG. 1 and computing device 10 of FIG. 2. For purposes of illustration only, the techniques of FIG. 4 are described within the context of computing device 10 of FIG. 2, although computing devices having configurations different than that of computing device 10 of FIG. 2 may perform the techniques of FIG. 4.

As shown in FIG. 4, computing device 10 may authenticate a user of computing device 10 as an authorized user (402). Computing device 10 may, in response to authenticating the user of the computing device 10 as the authorized user, transition from a locked state to an unlocked state (404). Computing device 10 may, in response to authenticating the user of the computing device 10 as the authorized user, determine one or more computing devices that are proximate to the computing device 10 (406). Computing device 10 may, in response to determining the one or more computing devices that are proximate to the computing device 10, send, to each of the one or more computing devices, an indication of successful user authentication by the computing device 10 to enable each of the one or more computing devices to transition from the locked state to the unlocked state without performing user authentication (308).

In some examples, to determine the one or more computing devices that are proximate to the computing device, computing device 10 may determine location information associated with a plurality of computing devices and may determine, based at least in part on the location information associated with the plurality of computing devices, the one or more computing devices that are proximate to the computing device 10 as the one or more computing devices that are within a specified physical distance from the computing device 10.

In some examples, to send to each of the one or more computing devices the indication of successful user authentication, computing device 10 may send, to each of the one or more computing devices, an indication of a respective access level to be provided by each of the one or more computing devices in the unlocked state. In some examples, computing device 10 may further determine the access level to be provided by each of the one or more computing devices in the unlocked state based at least in part on a distance between the computing device and each of the one or more computing devices.

In some examples, to determine the one or more computing devices that are proximate to the computing device 10, computing device 10 may determine that a first one or more computing devices proximate to the computing device 10 are members of a team that includes the computing device 10, determine that a second one or more computing devices proximate to the computing device 10 are not members of the team that includes the computing device 10, and determine, based on the first one or more computing devices being members of the team that includes the computing device 10 and the second one or more computing devices not being members of the team that includes the computing device 10, the first one or more computing devices as the one or more computing devices that are proximate to the computing device 10.

In some examples, computing device 10 may transition from the unlocked state to the locked state, receive, in the locked state from a second computing device proximate to the computing device 10, an indication of successful user authentication by the second computing device, and in response to receiving the indication of successful user authentication by the second computing device, transition from the locked state to the unlocked state.

In some examples, to, in response to receiving the indication of successful user authentication by the second computing device, transition from the locked state to the unlocked state, computing device 10 may, in response to receiving the indication of successful user authentication by the second computing device, verify that the second computing device is associated with the computing device 10, and in response to verifying that the second computing device is associated with the computing device 10, transition from the locked state to the unlocked state.

In some examples, to transition from the locked state to the unlocked state, computing device 10 may provide an access level specified by the indication of successful user authentication by the second computing device.

In some examples, to transition from the locked state to the unlocked state, computing device 10 may, in response to determining that the computing device 10 has not received user input within a specified timeout period, send, to the second computing device, a query regarding whether the second computing device is in the unlocked state. Computing device 10 may receive, from the second computing device, a reply to the query. Computing device 10 may, in response to receiving the query from the second computing device indicating that the second computing device indicating that the second computing device is in the unlocked state, remain in the unlocked state.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium may include a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

What is claimed is:

1. A method comprising:
authenticating, by a computing device, a user of the computing device as an authorized user;
in response to authenticating the user of the computing device as the authorized user, transitioning, by the computing device, from a locked state to an unlocked state;
in response to authenticating the user of the computing device as the authorized user, determining, by the computing device, one or more computing devices that are proximate to the computing device;
determining, by the computing device, a corresponding access level to functionalities of a corresponding computing device to be provided by each of the one or more computing devices in the unlocked state to a corresponding user based at least in part on a corresponding distance between the computing device and each of the one or more computing devices, wherein the corresponding access level to functionalities of the corresponding computing device indicates one or more applications that are accessible in the unlocked state at the corresponding access level out of a plurality of applications installed at the corresponding computing device; and
in response to determining the one or more computing devices that are proximate to the computing device, sending, by the computing device to each of the one or more computing devices, an indication of the corresponding access level to be provided by each of the one or more computing devices in the unlocked state and an indication of successful user authentication by the computing device to enable each of the one or more computing devices to transition from the locked state to the unlocked state without performing user authentication.

2. The method of claim 1, wherein determining the one or more computing devices that are proximate to the computing device further comprises:
determining, by the computing device, location information associated with a plurality of computing devices; and
determining, by the computing device and based at least in part on the location information associated with the plurality of computing devices, the one or more computing devices that are proximate to the computing device as the one or more computing devices that are within a specified physical distance from the computing device.

3. The method of claim 1, wherein determining the one or more computing devices that are proximate to the computing device further comprises:
determining, by the computing device, that a first one or more computing devices proximate to the computing device are members of a team that includes the computing device;
determining, by the computing device, that a second one or more computing devices proximate to the computing device are not members of the team that includes the computing device; and determining, by the computing device and based on the first one or more computing devices being members of the team that includes the computing device and the second one or more computing devices not being members of the team that includes the computing device, the first one or more computing devices as the one or more computing devices that are proximate to the computing device.

4. The method of claim 1, further comprising:
transitioning, by the computing device, from the unlocked state to the locked state;
receiving, by the computing device in the locked state from a second computing device proximate to the computing device, an indication of successful user authentication by the second computing device; and
in response to receiving the indication of successful user authentication by the second computing device, transitioning, by the computing device, from the locked state to the unlocked state.

5. The method of claim 4, wherein in response to receiving the indication of successful user authentication by the second computing device, transitioning, from the locked state to the unlocked state further comprises:
in response to receiving the indication of successful user authentication by the second computing device, verifying, by the computing device, that the second computing device is associated with the computing device; and
in response to verifying that the second computing device is associated with the computing device, transitioning, by the computing device, from the locked state to the unlocked state.

6. The method of claim 5, wherein transitioning, by the computing device, from the locked state to the unlocked state further comprises:
providing, by the computing device, an access level specified by the indication of successful user authentication by the second computing device.

7. The method of claim 5, wherein transitioning, by the computing device, from the locked state to the unlocked state further comprises:
in response to determining that the computing device has not received user input within a specified timeout period, sending, by the computing device to the second computing device, a query regarding whether the second computing device is in the unlocked state;
receiving, by the computing device from the second computing device, a reply to the query; and
in response to receiving the query from the second computing device indicating that the second computing device is in the unlocked state, remaining, by the computing device, in the unlocked state.

8. A computing device comprising:
memory; and
processing circuitry operably coupled to the memory and configured to:
authenticate a user of the computing device as an authorized user;
in response to authenticating the user of the computing device as the authorized user, transition from a locked state to an unlocked state;
in response to authenticating the user of the computing device as the authorized user, determine one or more computing devices that are proximate to the computing device;
determine a corresponding access level to functionalities of a corresponding computing device to be provided by each of the one or more computing devices in the unlocked state to a corresponding user based at least in part on a corresponding distance between the computing device and each of the one or more computing devices, wherein the corresponding access level to functionalities of the corresponding computing device indicates one or more applications that are accessible in the unlocked state at the corresponding access level out of a plurality of applications installed at the corresponding computing device; and in response to determining the one or more computing devices that are proximate to the computing device, send to each of the one or more computing devices, an indication of the corresponding access level to be provided by each of the one or more computing devices in the unlocked state and an indication of successful user authentication by the computing device to enable each of the one or more computing devices to transition from the locked state to the unlocked state without performing user authentication.

9. The computing device of claim 8, wherein to determine the one or more computing devices that are proximate to the computing device, the processing circuitry is further configured to:

determine location information associated with a plurality of computing devices; and determine, based at least in part on the location information associated with the plurality of computing devices, the one or more computing devices that are proximate to the computing device as the one or more computing devices that are within a specified physical distance from the computing device.

10. The computing device of claim 8, wherein to determine the one or more computing devices that are proximate to the computing device, the processing circuitry is further configured to:

determine that a first one or more computing devices proximate to the computing device are members of a team that includes the computing device;

determine that a second one or more computing devices proximate to the computing device are not members of the team that includes the computing device; and determine, based on the first one or more computing devices being members of the team that includes the computing device and the second one or more computing devices not being members of the team that includes the computing device, the first one or more computing devices as the one or more computing devices that are proximate to the computing device.

11. The computing device of claim 8, wherein the processing circuitry is further configured to:

transition from the unlocked state to the locked state;

receive, in the locked state from a second computing device proximate to the computing device, an indication of successful user authentication by the second computing device; and in response to receiving the indication of successful user authentication by the second computing device, transition from the locked state to the unlocked state.

12. The computing device of claim 11, wherein to, in response to receiving the indication of successful user authentication by the second computing device, transition from the locked state to the unlocked state, the processing circuitry is further configured to:

in response to receiving the indication of successful user authentication by the second computing device, verify that the second computing device is associated with the computing device; and in response to verifying that the second computing device is associated with the computing device, transition from the locked state to the unlocked state.

13. The computing device of claim 12, wherein the processing circuitry configured to transition from the locked state to the unlocked state is further configured to:

provide an access level specified by the indication of successful user authentication by the second computing device.

14. The computing device of claim 12, wherein to transition from the locked state to the unlocked state, the processing circuitry is further configured to:

in response to determining that the computing device has not received user input within a specified timeout period, send, to the second computing device, a query regarding whether the second computing device is in the unlocked state;

receive, from the second computing device, a reply to the query; and in response to receiving the query from the second computing device indicating that the second computing device is in the unlocked state, remain in the unlocked state.

15. A non-transitory computer readable storage medium storing instructions that, when executed by one or more processors of a computing device, cause the one or more processors to:

authenticate a user of the computing device as an authorized user;

in response to authenticating the user of the computing device as the authorized user, transition from a locked state to an unlocked state;

in response to authenticating the user of the computing device as the authorized user, determine one or more computing devices that are proximate to the computing device;

determining, by the computing device, a corresponding access level to functionalities of a corresponding computing device to be provided by each of the one or more computing devices in the unlocked state to a corresponding user based at least in part on a corresponding distance between the computing device and each of the one or more computing devices, wherein the corresponding access level to functionalities of the corresponding computing device indicates one or more applications that are accessible in the unlocked state at the corresponding access level out of a plurality of applications installed at the corresponding computing device; and in response to determining the one or more computing devices that are proximate to the computing device, send to each of the one or more computing devices, an indication of the corresponding access level to be provided by each of the one or more computing devices in the unlocked state and an indication of successful user authentication by the computing device to enable each of the one or more computing devices to transition from the locked state to the unlocked state without performing user authentication.

16. The computer readable storage medium of claim 15, wherein the instructions that cause the one or more processors to determine the one or more computing devices that are proximate to the computing device further cause the one or more processors to:
  determine location information associated with a plurality of computing devices; and
  determine, based at least in part on the location information associated with the plurality of computing devices, the one or more computing devices that are proximate to the computing device as the one or more computing devices that are within a specified physical distance from the computing device.

* * * * *